Inventors:
Ralph E. Church,
Stanley L. Lindt,
by John L. Stoudt
Attorney.

United States Patent Office 3,465,182
Patented Sept. 2, 1969

3,465,182
MOTOR VIBRATION SUPPRESSION
MOUNTING SYSTEM
Ralph E. Church, Fort Wayne, Ind., and Stanley L. Lindt, Morrison, Ill., assignors to General Electric Company, a corporation of New York
Filed Apr. 12, 1967, Ser. No. 630,420
Int. Cl. H02k 5/24
U.S. Cl. 310—51                8 Claims

ABSTRACT OF THE DISCLOSURE

An electric motor vibration suppression mounting system especially effective in controlling transmission of forces produced by a forced frequency of 120 cycles per second during operation from supporting structure. An electric motor has elongated members formed with beam-like deflectable sections extending away from the associated stator end faces, with the free ends of the members being mounted to the supporting structure. The elongated members are formed relatively rigid in an axial direction while being slightly deflectable in radial and torsional directions, such that they tend to suppress the transmission of vibration-producing forces to the supporting structure during operation. These sections are so constructed that they permit an attainment of a resonant frequency no greater than 40 cycles per second during operation. In addition, the motor includes a projection which is closely spaced from the supporting structure such that it engages the structure under the sudden application of a preselected load to limit radial movement of the motor.

Background of the invention

This invention relates to improved dynamolectric machine mounting arrangements, and more particularly to such arrangements wherein vibrations and noise producing forces from the machine, such as small and fractional horsepower electric motors, are transmitted to the support or apparatus on which the motor is mounted.

In the construction and support of small dynamoelectric machines, it is very desirable, if not essential, that operational noises and vibrations be kept as low as possible. This is especially the case for small electric motors intended for domestic and office use, as in, for example, fans, refrigerators, and other appliances. The problem of effective vibration and noise isolation becomes even more acute where it is desired to construct a motor which is capable of being mounted in any operating position, that is, a so-called "all angle" mounted motor.

In connection with alternating current induction motors, one of the most troublesome causes of noises and vibration is due to strong double line frequency pulsating forces (120 cycles per second forces from 60 cycle power source) originating in the motor during operation which, if transmitted to the appliance, would tend to excite certain of its component parts, such as panels in a refrigerator which, in turn, would result in objectionable vibration and noise. One of the most difficult sources of vibration to isolate is that causing torsional vibration. Generally speaking, the lower the torsional resonant frequency for a motor mounting system, the better the isolation, with the desired resonant frequency being a maximum of one third the forced frequency to be isolated. For example, in the case of 120 cycles per second forces, the system should have a resonant frequency no greater than 40 cycles per second and, preferably, much less.

In view of these factors and considerations, it has been a practical problem in providing a satisfactory yet relatively inexpensive motor mounting arrangement which is capable of controlling the transmission of vibrations, and in particular, vibrations resulting from 120 cycles per second pulsating forces, to a motor support structure. It has been especially difficult to furnish a motor mounting system having a torsional resonant frequency one third or less than the natural frequency to be isolated where the motor construction and its mounting arrangement concurrently permit operation of the motor at any desired angle relative to the horizontal. Further difficulty has been experienced in furnishing such an arrangement which is inexpensive to manufacture, economical to install, and at the same time is practical for utilization in domestic appliances and office equipment applications where noise producing vibrations are particularly objectionable.

Accordingly, it is the primary object of the invention to provide an improved arrangement for effectively controlling the transmission of vibration and noise producing forces from a dynamoelectric machine during operation of the equipment in which it is employed, including motor supporting components.

It is another object of the invention to provide an improved vibration suppression mounting arrangement which overcomes the difficulties and achieves the desirable features mentioned above.

It is a further object of this invention to provide an improved yet relatively inexpensive arrangement for suppressing motor vibrations, especially those resulting from 120 cycles per second pulsating forces, and to furnish a torsional resonant frequency substantially less than one third the frequency which is being isolated for all-angle type mounted motors.

Summary of the invention

In carrying out the objects of the invention in one form, we provide an improved arrangement especially effective in controlling the transmission of 120 cycles pulsating forces originating in a dynamoelectric machine, such as an alternating current induction electric motor, from the motor to the equipment in which it is employed. A plurality of elongated members are firmly attached to a stationary assembly, such as a stator, of the electric motor. The elongated members have beam-like deflectable sections extending away from at least one end face of the stator, the sections being disposed between a supporting structure and the associated end face. These sections are formed relatively stiff in an axial direction, while being deflectable compliant in radial and torsional directions relative to the axis of rotation of the rotatable member during operation of the motor.

In the preferred embodiment, the elongated members include a pair of beam-like sections integrally joined together into a single piece by a central section which extends entirely through the stator and is secured to it. At their free ends, the elongated members include extensions and radial enlargements which are assembled to the supporting structure for mounting the motor thereto. With the foregoing arrangement, the beam-like deflectable sections tend to suppress the transmission of vibration producing forces to the supporting structure and are capable of limiting the resonant frequency to no greater than 40 cycles per second. Furthermore, this vibration suppression may be accomplished even though the motor is mounted at a number of different angles relative to the horizontal. Moreover, the arrangement is easily assembled together, readily installed on the supporting structure, and is quite economical to fabricate. In addition, there is no axial build-up of manufacturing motor tolerances with the use of the above arrangement, while accurate control of the final axial position of any fan attached to the motor shaft relative to the supporting structure is easily achieved.

The subject matter which we regard as our invention is particularly pointed out and distinctly claimed in the concluding portion of this specification. Our invention itself, however, both as to its organization and method of operation, together with further objects and advantages thereof may best be understood by reference to the following description taken in connection with the accompanying drawing.

Description of the preferred embodiments

Figure 3:
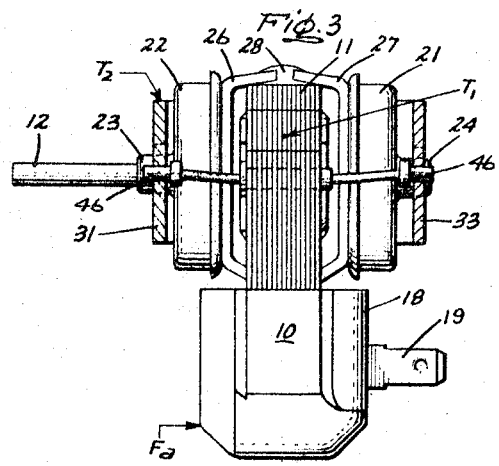
FIGURE 3 is a side elevational view of the motor shown in FIGURE 1.
Figure 4:
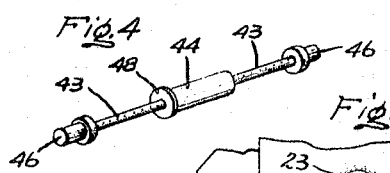
FIGURE 4 is a view in perspective of one of the vibration isolation members seen in the other figures.

Referring now to the drawing in more detail, one preferred embodiment of our invention is disclosed in connection with a fractional horsepower, alternating current, shaded pole induction electric motor 10 of the kind revealed more fully in the H. C. Kaeding Patents 3,196,297 and 3,270,227, both assigned to the same assignee as the present invention. Briefly described, the motor is constructed with a stator 11 of a stationary assembly and a rotatable assembly including a shaft 12 and rotor 13 having a cast squirrel cage secondary winding 14 with slightly skewed conductors in the usual way. Stator 11 is fabricated with a magnetic core formed of a stack of secured together laminations providing a pair of oppositely disposed pole faces which define a rotor receiving bore 16. Suitable shading coils 17 are disposed at the trailing ends of the stator pole faces to furnish starting torque and to aid in producing running torque. An electrical coil or winding, enclosed within an imperforate covering of insulating material 18 and mounted on a depending winding leg of the stator yoke section, produces magnetic flux for excitation of the motor. The winding is adapted to be connected to an alternating current power source, such as a 115 volt, 60 cycles per second source not shown, through male quick-connect terminals 19 (FIGURE 3).

In order to support the rotatable assembly and stator for relative rotation, the stationary assembly has a pair of similar end frame or bearing assemblies 21, 22, the only difference between the two assemblies being that assembly 22 includes an open end cap 23 to accommodate the output extension of shaft 12. End cap 24 of assembly 21 is closed since the motor is of the single shaft output type. The respective bearing assemblies are, in turn, attached to stator 11 by suitable generally U-shaped metal brackets 26, 27 having opposed legs cemented to the periphery of the stator, as indicated at 28 in the drawing.

Figure 1:
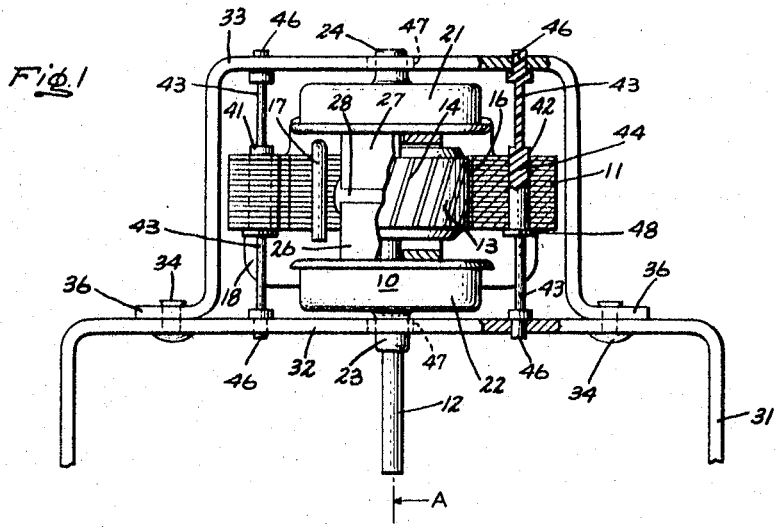
FIGURE 1 is a plan view, partially broken away to show details, of an electric motor and its supporting structure incorporating one preferred form of the present invention.

The preferred arrangement will now be considered in which the motor 10 of the exemplification is supported to suppress or limit the transmission of vibration and noise generating forces, especially those resulting from torsional vibrations and rotating mass unbalance, from the motor during operation to the equipment where the motor is employed. It will be assumed for purposes of illustration that the stationary supporting structure of the equipment incorporating motor 10 includes a rigid bracket or plate 31 having a vertical wall 32. As best seen in FIGURE 1 in the exemplification, a second plate 33 of generally U-shaped configuration is securely connected to wall 32 of plate 31 by rivets 34 which project through section 32 and the adjacent flange 36 at the terminations of the leg sections of plate 33.

Motor 10 in the exemplification is supported by an improved vibration suppression mounting system between plates 31, 33 such that the motor is in spaced relation with the plates under normal operating conditions by a pair of spaced apart and similarly constructed vibration-suppressing elongated members 41, 42 capable of providing a torsional resonant frequency less than one third of the natural frequency desired to be isolated; e.g., 120 cycles per second. More specifically, each member is integrally formed into a single piece, having a deflectable or flexible beam-like section 43 extending away in an axial direction, generally parallel to axis of rotation A, from each end face of the stator. These sections of the same member are joined together by an enlarged intermediate section 44 which projects axially through a complementary passageway provided in the stator yoke section by aligned laminate holes. An elongated member is disposed adjacent either side of the rotatable assembly and rigidly secured to the stator by a tight frictional fit between section 44 and the walls of the passageways although any other suitable securing means may be utilized. The free ends of the elongated members terminate in flanged extensions 46 which are seated or received in suitably and generally opposed openings furnished in walls 32, 33 to mount the motor therebetween.

It should be noted at this time that members 41, 42 are so formed that deflectable sections 43 have the attributes of slightly flexible or constrained beams, the deflectable sections being stable or stiff in the axial direction, yet being compliant to limited radial and torsional movement in response to noise-producing pulsating forces generated during normal motor operation, thereby tending to isolate the pulsating forces. Deriving optimum vibration isolation benefits of the invention for a given motor mass will of course be primarily dependent upon such combination of factors as type of flexible material, cross-section area, over-all contour, and axial length chosen for sections 43. Generally speaking, to obtain the best results with the illustrated embodiment of the invention, members 41, 42 should be formed of spring-like material, for instance, hardened thermoresponsive slightly flexible material or steel spring wire, and be so dimensioned and shaped as to provide the lowest spring constant possible consistent with good mounting stability for a particular motor mass, for example a constant in the range of 100-110 pounds per inch. By making the elongated members of molded thermoplastic, or if made of steel material, by coating them with electrical insulating material, the members 41, 42 will also serve to insulate the motor electrically from the supporting structure. In addition, the largest dimension across section 43 should be slightly less than that for section 44 when each member is mounted in the manner shown in the illustrated embodiment to permit assembly of the parts.

Figure 5:
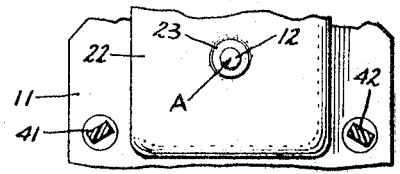
FIGURE 5 is a partial end elevational view of a motor similar to that of FIGURE 1 incorporating a modified form of the present invention.

A round cross-section contour for sections 43 furnish the minimum stiffness in torsion while the maximum degree of radial stiffness for members 41, 42 may be provided by forming sections 43 with a larger dimension or major axis oriented in the direction toward the axis A, as seen in FIGURE 5.

In order to prevent damage to the arrangement from a sudden load imparted to the unit as might occur, for instance, where the motor and its support undergo considerable handling and shipping, plates 31, 33 are furnished with opposed openings 47 through which project end caps 23, 24 in spaced relation with the walls of the opening and the output end of the shaft 12. The spacing between the end caps and associated plates is chosen to limit movement of the motor and elongated members 41, 42 upon the sudden application of an impact load thereby protecting the motor and elongated members from possible damage and breakage.

The present invention has beneficial features in addition to those already discussed. It is relatively simple to regulate the final position of the motor axis A relative to the supporting structure; e.g., plates 31, 33, without a build-up of tolerances in the axial direction of the motor. In this regard, enlarged shoulders 48, along with the flanges of terminations 46, serves to properly locate the elongated members 41, 42 with reference to the supporting structure. Moreover, it is readily possible to control fan position on the shaft relative to the supporting structure with a great degree of accuracy. Further, the stator, elongated members, and supporting structure are not only economical to fabricate but also capable of rapid assembly. For instance, prior to the attachment of plates 31, 33 together by rivets 34, members 41, 42 may be installed onto the stator, the relative axial positions being controlled by shoulders 48. Thereafter, flanged extensions may be inserted into suitable holes or openings in the plates, with end caps 23, 24 projecting through associated openings 47, and the plates finally riveted or otherwise secured together.

Further beneficial features and advantages of the present invention will become more apparent from the following example which shows how the invention, as illustrated, has been carried forth in actual practice. The material employed for elongated members 41, 42 was molded thermoplastic acetal resin haivng a specific gravity of 1.425, tensile strength of 10,000 p.s.i. with 15% elongation, Rockwell hardness of M94, and the ability to retain strength close to 347° F. Members 41, 42 had an overall length of 2.34 inches while sections 43 had nominal lengths of 0.575 inch and a diameter over 0.08 inch. The motors weighed 0.82 pound, having a ½ inch stack length and were suspended between plates 31, 33 in the manner shown, with the axis A being basically horizontal.

Figure 2:
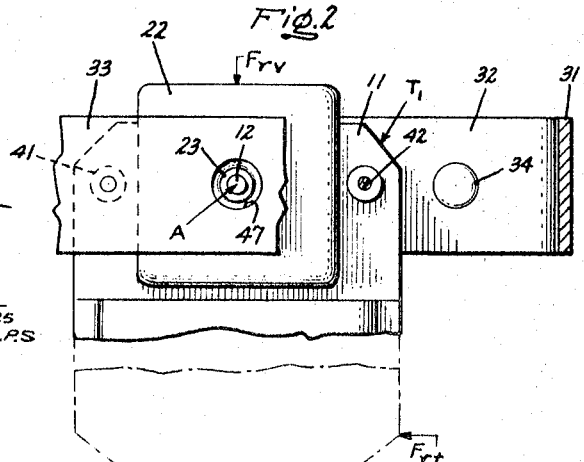
FIGURE 2 is an end elevational view of a part of the motor shown in FIGURE 1, the view being taken at the output end of the motor.

Points $T_1$ and $T_2$ in FIGURES 2 and 3 indicate two vibration accelerometer positions used to determine 120 cycles per second vibration attentuation afforded by the mounting system under 60 cycles per second normal operation of the motor. The axis of sensitivity was oriented to the direction of resonance frequency being sensed. The arrows and $F_{rt}$, $F_{rv}$ and $F_a$ in the same figures respectively indicate the direction of excitation and deflection for the horizontal radial tilt, radial vertical, and axial tilt resonance modes. The following table is representative of the results for a number of motors so tested:

| Type of resonance | Resonant frequency, c.p.s. | Torsional vibration, $T_1$ | Torsional vibration, $T_2$ | 120 c.p.s. net attenuation |
|---|---|---|---|---|
| $F_{rt}$ | 17.4 | −21DB | −40.5DB | 19.5DB |
| $F_{rv}$ | 32.4 | 9.121 mils | 9.013 mils | 0.108 mils |
| $F_a$ | 22.4 | | | |

Figure 6:
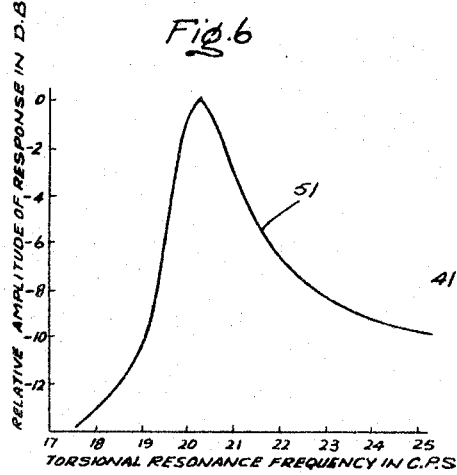
FIGURE 6 is a curve showing the torsional response characteristic for one size electric motor embodying the illustrated form of the present invention shown in FIGURES 1-4.

The torsional response characteristic for the tested mounting system is revealed by curve 51 in FIGURE 6 showing that the torsional resonance frequency was 20.2 cycles per second, well below the 40 cycles per second maximum value mentioned previously for the 120 cycles per second forced frequency. The foregoing results clearly demonstrate the unusual vibration suppression or isolation characteristics which may be achieved by the present invention, and this is the case even where the motor axis is mounted non-horizontally. Thus, the present invention may be employed quite effectively as an all-angle mounting system and still retain the beneficial results thereof. Moreover, especially when the motor axis A is vertically disposed during operation, it is quite convenient and economical to use sections 43 at only one side of the motor.

Consequently, it should be apparent to those skilled in the art that while we have shown and described what at present is considered to be the preferred embodiments of our invention in accordance with the patent statutes, it is to be understood that modifications can be made without actually departing from the true spirit and scope of this invention, and we therefore intend to cover in the following claims all such equivalent variations as fall within the invention.

What we claim as new and desire to secure by Letters Patent of the United States is as follows:

1. In an arrangement adapted to produce a predetermined double line frequency pulsating force during operation and having a vibration suppression mounting system including support wall means with at least one opening formed therein, an electric motor comprising a stator formed with end faces; a rotatable assembly revolvable around an axis of rotation; frame means supporting the stator and rotatable assembly for relative rotation; and a plurality of elongated members firmly attached to said stator, said members having beam-like deflectable sections extending away from at least one end face thereof disposed between the support wall means and the associated at least one end face, said beam-like sections being formed relatively stiff in an axial direction and being deflectably compliant in radial and torsional directions relative to the axis of rotation during operation of the motor, and means for mounting said elongated members axially beyond said beam-like deflectable sections to the support wall means, whereby the beam-like deflectable sections tend to suppress the transmission of vibration-producing forces to the support wall means during motor operation.

2. The electric motor of claim 1 in which the frame means includes a projection arranged to extend into the at least one opening in spaced relation with the support wall means, said projection being adapted to engage the support wall means under the sudden application of a preselected load to the motor for limiting radial movement thereof.

3. The electric motor of claim 1 in which the beam-like sections of the elongated members include means for limiting a resonant frequency to no greater than one third of the predetermined double line frequency force.

4. The electric motor of claim 1 in which the means for mounting the elongated members to the support wall means includes a free end extension and radial enlargement formed on the elongated members adjacent the beam-like sections, remote from the associated end face of the stator.

5. The electric motor of claim 1 in which the elongated members have a pair of beam-like sections integrally joined together into a single piece by an intermediate section, a plurality of said beam-like sections extending away from each end face of the stator, and said intermediate sections projecting axially into the stator and being firmly secured thereto.

6. In an electric motor vibration suppression mounting arrangement including support wall means, an electric motor having a stationary assembly including a stator; a rotatable assembly revolvable around an axis of revolution; and a plurality of elongated members firmly attached to said stationary assembly and extending in a direction generally away from the stator, said elongated members including first sections secured to said stationary assembly, second sections for attachment to the support wall means, and beam-like deflectable sections disposed between said first and second sections being formed relatively rigid in an axial direction and being slightly deflectable in radial and torsional directions relative to the axis of revolution during motor operation, whereby said beam-like sections tend to control the transmission of at least radial and torsional forces to the support wall means as the rotatable assembly rotates about its axis of revolution.

7. The electric motor of claim 6 in which the elongated members comprise a pair of beam-like sections integrally joined together by said first sections.

8. The electric motor of claim 7 in which the radial cross-section area of said first sections exceeds that of said beam-like sections.

References Cited

UNITED STATES PATENTS

| | | |
|---|---|---|
| 2,320,843 | 6/1943 | Baudry. |
| 2,353,763 | 7/1944 | Rodman _____ 310—51 |
| 3,043,970 | 7/1962 | Hatten _____ 310—91 |

FOREIGN PATENTS 952,197  11/1956  Germany.

WARREN E. RAY, Primary Examiner

R. SKUDY, Assistant Examiner

U.S. Cl. X.R.

310—91